(12) United States Patent
Kershenstein (10) Patent No.: US 8,718,729 B1
(45) Date of Patent: May 6, 2014

(54) ELECTRONIC DEVICE PROTECTION SYSTEM

(71) Applicant: Timothy Kershenstein, San Antonio, TX (US)

(72) Inventor: Timothy Kershenstein, San Antonio, TX (US)

(*) Notice: Subject to any disclaimer, the term of this patent is extended or adjusted under 35 U.S.C. 154(b) by 0 days.

(21) Appl. No.: 13/665,789

(22) Filed: Oct. 31, 2012

(51) Int. Cl.
  *H04B 1/38* (2006.01)

(52) U.S. Cl.
  USPC ............ 455/575.8; 2/247; 206/701; 206/719; 206/720

(58) Field of Classification Search
  USPC .............. 455/575.1–575.9, 550.1, 90.1–90.3; 206/719, 720; 2/247
  See application file for complete search history.

(56) References Cited

U.S. PATENT DOCUMENTS

| | | | |
|---|---|---|---|
| 366,757 | A | 7/1887 | Biovin |
| 396,951 | A | 1/1889 | Packard |
| 472,373 | A | 4/1892 | Levey |
| 519,275 | A | 5/1894 | Sellenscheidt et al. |
| 568,605 | A | 9/1896 | Frame |
| 2,321,807 | A | 6/1943 | Glickman |
| 4,489,770 | A | 12/1984 | Reich, II |
| 5,242,056 | A | 9/1993 | Zia et al. |
| 6,758,335 | B2 | 7/2004 | Kajiya |
| 6,935,497 | B1 | 8/2005 | Domotor et al. |
| 7,099,710 | B1 | 8/2006 | Faillance |
| D602,689 | S | 10/2009 | Hewitt |
| 7,609,512 | B2 | 10/2009 | Richardson et al. |
| 7,769,408 | B2 * | 8/2010 | Hansson ................ 455/550.1 |
| 8,016,173 | B2 | 9/2011 | Dvorak |
| 2001/0035444 | A1 | 11/2001 | Alis |
| 2002/0175096 | A1 | 11/2002 | Linihan |
| 2002/0175099 | A1 * | 11/2002 | Wu .......................... 206/320 |
| 2002/0176593 | A1 * | 11/2002 | Magnusson et al. ....... 381/301 |
| 2005/0016647 | A1 | 1/2005 | Carey et al. |
| 2005/0164352 | A1 | 7/2005 | Lauder et al. |
| 2005/0258057 | A1 | 11/2005 | Gelphman et al. |
| 2006/0196792 | A1 | 9/2006 | Barth et al. |
| 2006/0272969 | A1 * | 12/2006 | Hartstein et al. ............. 206/320 |
| 2007/0142103 | A1 * | 6/2007 | Livne ....................... 455/575.5 |
| 2007/0201689 | A1 | 8/2007 | Uramoto et al. |
| 2007/0215663 | A1 | 9/2007 | Chongson et al. |
| 2007/0261978 | A1 | 11/2007 | Sanderson |
| 2008/0142129 | A1 | 6/2008 | Reasner et al. |
| 2008/0214252 | A1 | 9/2008 | Oten et al. |
| 2008/0302687 | A1 | 12/2008 | Sirichai et al. |
| 2009/0088229 | A1 * | 4/2009 | Hammad et al. ............ 455/575.5 |
| 2010/0172509 | A1 * | 7/2010 | Shim ......................... 381/71.1 |
| 2011/0000944 | A1 * | 1/2011 | Hood ......................... 224/576 |
| 2011/0006725 | A1 * | 1/2011 | Wilson ....................... 320/101 |

(Continued)

*Primary Examiner* — Sharad Rampuria
*Assistant Examiner* — Khawar Iqbal
(74) *Attorney, Agent, or Firm* — Superior IP, PLLC; Dustin L. Call (57) ABSTRACT

A system for protecting an electronic device. The system includes a pocket, where the pocket is configured to receive an electronic device capable of receiving or transmitting electronic signals. The system also includes a cover, where the cover is directly attached to the pocket. The cover is configured to cover at least a portion of the pocket and prevent the electronic device from receiving or transmitting electronic signals in a direction toward the cover. The electronic device is allowed to receive or transmit electronic signals in a direction not toward the cover. The cover includes an opening. The opening is configured to allow an audio signal to pass through the cover and includes a mesh layer.

17 Claims, 5 Drawing Sheets

(56) References Cited

U.S. PATENT DOCUMENTS

2011/0290676 A1* 12/2011 Kershenstein ................. 206/37
2011/0294470 A1* 12/2011 Pasquero et al. ........... 455/412.2
2012/0047631 A1* 3/2012 Connolly ......................... 2/272
2012/0048949 A1* 3/2012 Yuzon et al. .................. 235/492
2012/0060261 A1* 3/2012 Raviv ............................... 2/252
2012/0185999 A1* 7/2012 Raviv ............................... 2/247
2012/0304357 A1* 12/2012 Highfield .......................... 2/69
2013/0095898 A1* 4/2013 Altschul et al. ............ 455/575.8

* cited by examiner

ELECTRONIC DEVICE PROTECTION SYSTEM

CROSS-REFERENCE TO RELATED APPLICATIONS

Not applicable

BACKGROUND OF THE INVENTION

Cell phones and other mobile electronic devices are becoming increasingly popular. An ever larger segment of the population carries these devices. Further, more people continue to rely on these devices for a variety of communication, including making phone calls, sending and receiving emails and text messages. Additionally, these users often store a large number of documents on these electronic devices. These documents and other information stored on the electronic device can contain sensitive information, that the user is unwilling to share.

Nevertheless, hacking and stealing information from these electronic devices has become a problem in recent years. In particular, these devices can constantly be connecting to unknown wireless and cell networks where the information can be subjected to theft. This can lead to large problems for the owner of the electronic device.

Additionally, the high level of data transmission can lead to health problems for the owner. In particular, cellular phone transmissions have been linked to several types of cancer in recent years. Whether or not these links are proven to exist, a user may wish to be protected in order to ensure his or her safety. However, these electronic devices generally send and receive data automatically unless turned off.

Accordingly, there is a need in the art for a system that can prevent the theft of data stored on mobile electronic devices. Additionally, there is a need in the art for the system to prevent connection to outside networks until desired by the user. Further there is a need for the system to protect the user from the potentially dangerous radiation produced by the electronic device.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a system for protecting an electronic device. The system includes a pocket, where the pocket is configured to receive an electronic device capable of receiving or transmitting electronic signals. The system also includes a cover, where the cover is directly attached to the pocket. The cover is configured to cover at least a portion of the pocket and prevent the electronic device from receiving or transmitting electronic signals in a direction toward the cover. The electronic device is allowed to receive or transmit electronic signals in a direction not toward the cover. The cover includes an opening. The opening is configured to allow an audio signal to pass through the cover and includes a mesh layer.

Another example embodiment includes a system for protecting an electronic device. The system includes a pocket, where the pocket is configured to receive an electronic device capable of receiving or transmitting electronic signals. The pocket includes a clear portion, where the clear portion is configured to allow a user to access the electronic device while in the pocket. The system also includes a cover, where the cover is directly attached to the pocket. The cover is configured to cover at least a portion of the pocket and prevent the electronic device from receiving or transmitting electronic signals in a direction toward the cover. The electronic device is allowed to receive or transmit electronic signals in a direction not toward the cover. The cover includes an opening. The opening is configured to allow an audio signal to pass through the cover and includes a mesh layer.

Another example embodiment includes a system for protecting a mobile phone. The system includes a first pocket, where the first pocket includes an opening. The first pocket is configured to receive a mobile phone capable of receiving or transmitting electronic signals. The first pocket includes a clear portion, where the clear portion is configured to allow a user to access the mobile phone while in the first pocket. The system also includes a cover. The cover is configured to cover at least a portion of the first pocket and prevent the mobile phone from transmitting electronic signals in the direction of the cover when the mobile phone is in use. The mobile phone is allowed to receive or transmit electronic signals in a direction not toward the cover. The cover includes a first opening. The first opening is configured to allow an audio signal to pass through the cover from the user toward the mobile phone and includes a mesh layer. The cover also includes a second opening. The second opening is configured to allow an audio signal to pass through the cover from the mobile phone toward the user and includes a mesh layer. The first pocket and the cover are formed of a single piece of material. The system also includes a second pocket, where the second pocket is configured to receive one or more credit cards.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
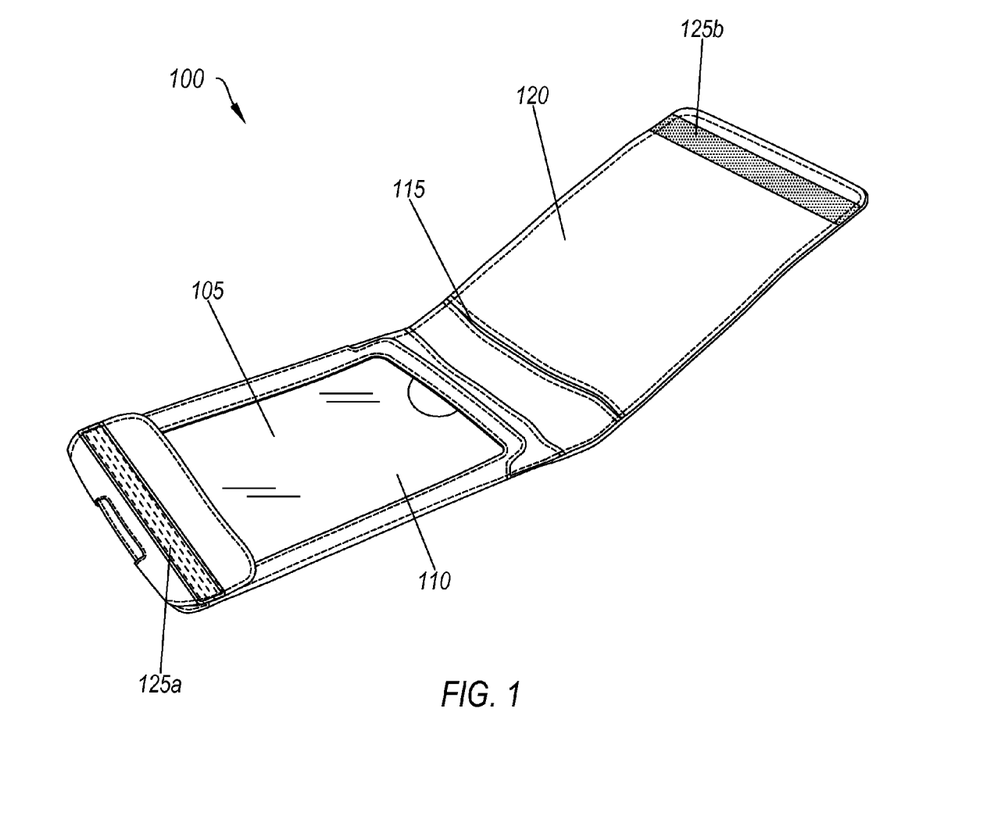
FIG. 1 illustrates an example of a system for protecting an electronic device.

FIG. 1 illustrates an example of a system 100 for protecting an electronic device. In at least one implementation, the system 100 can protect the electronic device from external influences that could damage the electronic device. In particular, the system 100 can protect the electronic device from damage caused by water, external forces or other potential damage. Additionally or alternatively, the system 100 can protect the electronic device form being hacked or otherwise compromised. In addition, the system 100 can protect the user form electromagnetic (EM) radiation produced by the phone, as described below.

In at least one implementation, the system 100 is capable of protecting any electronic device. For example, the system 100 can be used with cell phones, tablet computers, e-readers, laptops, palm computers, iPods or any other electronic device. In particular, the system 100 can be used with any mobile electronic device. The electronic device can be capable of receiving or transmitting electronic signals.

In at least one implementation, the system 100 can include any material which is capable of retaining the electronic device. For example, the system 100 can include leather, cloth, plastic or any other material. One of skill in the art will appreciate that the system 100 can include a single material or a combination of materials, unless otherwise specified in the specification or claims.

FIG. 1 shows that the system 100 can include a device pocket 105. In at least one implementation, the device pocket 105 is capable of receiving and retaining all or part of the electronic device. For example, the device pocket 105 can retain the portion of the electronic device which the user rarely needs to access, such as the rear or bottom of the electronic device. Additionally or alternatively, the device pocket 105 can retain the entire electronic device, and the user can use the electronic device while in the device pocket 105. The device pocket 105 can include an open portion that allows the user to remove the electronic device as desired.

FIG. 1 shows that the system 100 can include a clear face 110. In at least one implementation, the clear face 110 can allow the user to access at least a portion of the electronic device as desired. For example, the clear face 110 can allow the user to view the display of the electronic device. Additionally or alternatively, the clear face 110 can allow the user to access the keyboard or keypad of the electronic device through the clear face 110.

In at least one implementation the clear face 110 can include more than one layer. I.e., the clear face 110 can include multiple layers such that the electronic device or one or more accessories can be placed in between the layers. Placing the electronic device in between the layers can provide a waterproof protection for the electronic device. Additionally or alternatively, multiple layers within the clear face 110 can trap air, which can make the system 100 buoyant in water.

FIG. 1 further shows that the system 100 can include a stealth pocket 115. In at least one implementation, the stealth pocket 115 can allow the user to place the electronic device, or other devices such as accessories to the electronic device, where they are not easily visible.

FIG. 1 also shows that the system 100 can include a cover 120. In at least one implementation, the cover 120 can cover at least a portion of the device pocket 105. In particular, the cover 120 can be moved from a first position where the device pocket 105 is accessible to the user to a second position where the device pocket is not accessible.

In at least one implementation, the cover 120 can be configured to prevent the electronic device from receiving or transmitting electronic signals. This can allow the cover 120 to protect the user from EM radiation emitted by the phone. Additionally or alternatively, the cover 120 can prevent others from hacking or otherwise accessing information stored on the electronic device. The cover 120 can include material which absorbs EM radiation such that EM signals are unable to penetrate the cover. For example, the cover 120 can include metal, such as lead, lead fibers or silver, or other conductors which block the EM radiation. I.e., the cover 120 can include lead fibers woven into the fibers of the cover or nano-size ion silver metal embedded within the cover or coated on the cover. Additionally or alternatively, the cover can include a lead sheet within the cover which absorbs the EM radiation.

One of skill in the art will appreciate that a cover 120 configured to prevent the electronic device from receiving or transmitting electronic signals can be positioned during use to prevent EM radiation form be transmitted at the user. For example, the cover 120 can be moved to the rear of the system 100 while the user sets the electronic device on his/her lap or can be moved to the front of the system 100 while the user is speaking on the electronic device.

FIG. 1 further shows that the device pocket 105 and the cover 120 can include a first attachment 125a and a second attachment 125b (collectively "attachments 125"), respectively. In at least one implementation, the attachments 125 can include any attachment mechanism capable of releasably holding the cover 120 in a closed position. For example, the attachments 125 can include a hook and loop fastener, buttons, snaps, ties, hooks or any other attachment mechanism. One of skill in the art will appreciate that any mechanism capable of holding the cover 120 in a closed position, whether now existing or invented in the future, is contemplated herein.

Figure 2:
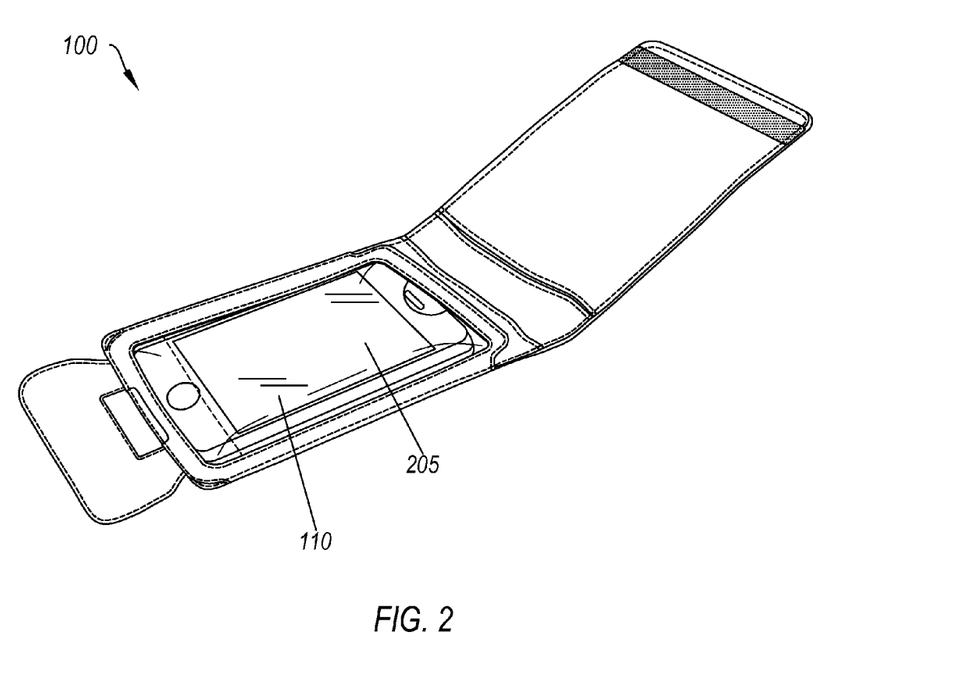
FIG. 2 illustrates an example of the system with an enclosed electronic device.

FIG. 2 illustrates an example of the system 100 with an enclosed electronic device 205. In at least one implementation, the electronic device 205 can be used even while in the device pocket 110. I.e., the device pocket 110 can protect the electronic device 205 even while the electronic device 205 is within the device pocket 110.

Figure 3:
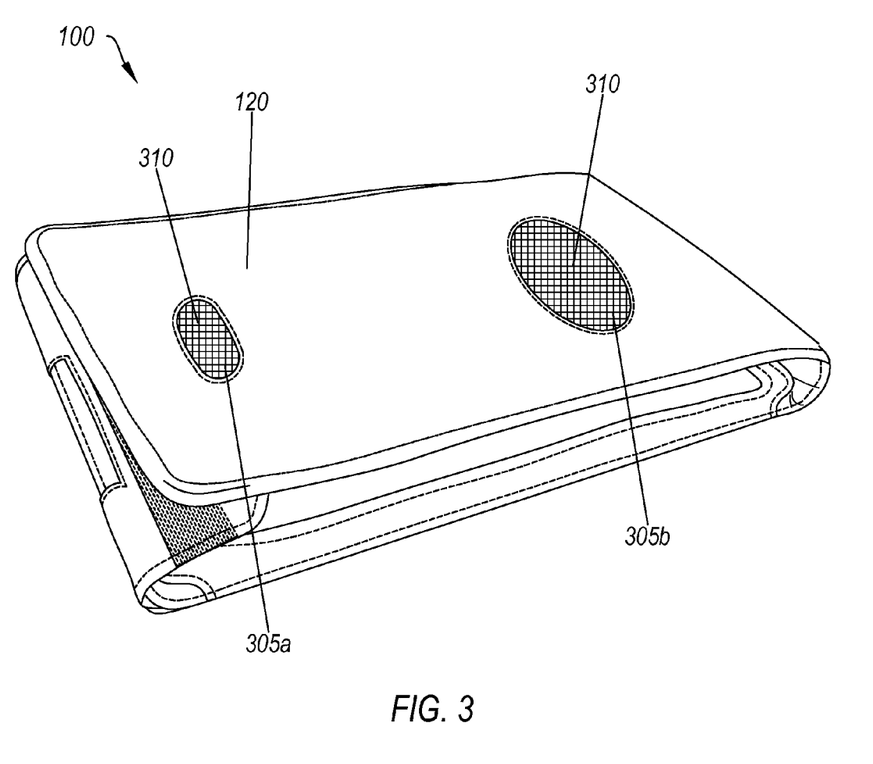
FIG. 3 illustrates an example of the system with the cover in a second, closed, position.

FIG. 3 illustrates an example of the system 100 with the cover 120 in a second, closed, position. In at least one implementation, cover 120 is capable of being moved from a closed position by virtue of its attachment to the system 100. In particular, the attachment between the system 100 can the cover 120 can be hinged, flexible or otherwise allow movement of the cover 120 relative to the system 100.

One of skill in the art will appreciate that in the second position, the cover 120 can prevent the reception or transmission of EM signals by the electronic device. In particular, the cover 120 can absorb the EM signals, as described above. In at least one implementation, this can prevent access to the electronic device. For example, the cover 120 in the second position can prevent the electronic device from connecting to a cellular network or other computer network and thus protect the phone from being accessed when the user so desires.

FIG. 1 shows that the cover 120 can include a first opening 305a and a second opening 305b (collectively "openings 305"). In at least one implementation, the openings 305 can be configured to allow a user to communicate through the cover 120. In particular, the first opening 305a can allow the phone to receive audio signals while in the device pocket 105 and the second opening 305b can allow the user to hear sounds produced by the phone while in the device pocket 105.

FIG. 1 also shows that the openings 305 can include a mesh 310. In at least one implementation, the mesh 310 can allow the audio signals to pass through the cover 120. In particular, the mesh 310 can focus the audio signal allowing a clearer signal to be transmitted through the first opening 305a to the microphone of the phone and the sound produced by the speaker of the phone to be clearer when heard through the second opening 305b.

Figure 4:
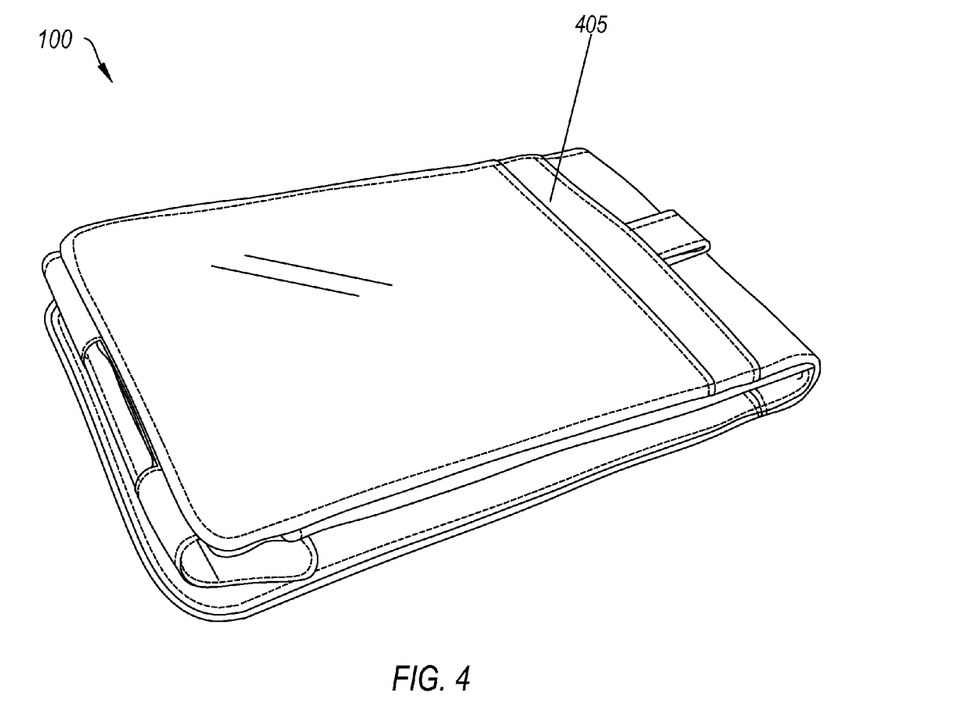
FIG. 4 illustrates a rear view of the system.

FIG. 4 illustrates a rear view of the system 100. In at least one implementation, the rear of the system 100 can absorb EM signals, similar to the cover 120. In particular, the rear of the system 100 can include material that is similar or substantially similar to the material used in the cover 120. Additionally or alternatively, the rear of the system 100 can include materials which absorb EM signals but which are different than the materials used in the cover 120.

FIG. 4 shows that the system 100 can include a rear pocket 405. In at least on implementation, the rear pocket 405 can be configured to receive accessories for the electronic device and/or additional electronic devices. Additionally or alternatively, the rear pocket 405 can be configured to receive one or more credit cards. In at least one implementation, the rear pocket 405 can protect the one or more credit cards from being remotely read.

In at least one implementation, the rear pocket 405 can be configured to contain credit cards or identification cards that are sized according to the ISO/IEC 7810 standard for 10-1 sized cards. The ISO/IEC 7810 standard is an international standard that defines the physical characteristics for identity or identification cards. The 10-1 format of the ISO/IEC 7810 standard specifies a size of 85.60×53.98 mm (3.370×2.125 in). The 10-1 format can be used for banking cards (ATM cards, credit cards, debit cards, etc.) for driver's licenses, personal identity cards, business cards, the United States passport card and any other type of identification card.

In at least one implementation, the rear pocket 405 can be configured such that an 10-1 format sized card can be retained within the rear pocket 405 without closing or otherwise securing the opening of the rear pocket 405. For example, the rear pocket 405 can be between 2.9 and 4.35 inches wide and 1.8 and 2.7 inches long, In particular, the rear pocket 405 can be approximately 3⅝ inches (3.625 inches) wide and 2¼ inches (2.25 inches) long. A rear pocket 405 that is 3⅝ inches by 2¼ inches can retain an 10-1 sized card using frictional forces between the pocket 410 and the card. As used in the specification and the claims, the term approximately shall mean that the value is within 10% of the stated value, unless otherwise specified.

Figure 5:
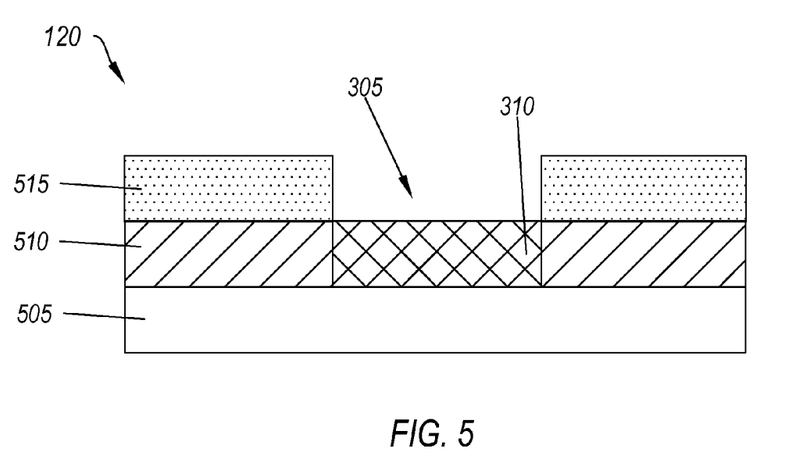
FIG. 5 illustrates a cross-sectional view of the cover.

FIG. 5 illustrates a cross-sectional view of the cover 120. In at least one implementation, the cover 120 can absorb EM signals to prevent radiation from reaching the user. The cover 120 can be placed to prevent radiation from being transmitted to the user. For example, the cover can be placed in front of the phone if the user is speaking on the phone or placed behind the phone if the phone is being placed on the user's lap.

FIG. 5 shows that the cover 120 can include an inner layer 505. In at least one implementation, the inner layer 505 can be the layer which is closest to the device pocket when the cover is closed. The inner layer 505 can be continuous. I.e., the inner layer 505 can be over the entirety of the cover 120. The inner layer 505 can include silk or any other desired material.

FIG. 5 also shows that the cover 120 can also include a middle layer 510. In at least one implementation, the middle layer 510 can provide structure to the cover 120. For example the middle layer 510 can include cardboard or other desired materials which add stiffness to the cover. Additionally or alternatively the middle layer 510 can include shielding material which absorbs EM signals, as described above.

FIG. 5 further shows that the cover 120 can further include an outer layer 515. In at least one implementation, the outer layer 515 can be configured to protect the phone or other electronic device. For example, the outer layer 515 can include leather or other material which can protect the phone from scratches and provide a level of shock absorption.

FIG. 5 additionally shows that the cover 120 can include an opening 305 in the outer layer 515. In at least one implementation, the opening 305 can be configured to allow a user to communicate through the cover 120. In particular, the opening 305 can allow the phone to receive audio signals while in the device pocket or can allow the user to hear sounds produced by the phone while in the device pocket.

FIG. 5 moreover shows that the opening 305 can include a mesh 310. In at least one implementation, the mesh 310 can allow the audio signals to pass through the cover 120. In particular, the mesh 310 can focus the audio signal allowing a clearer signal to be transmitted through the opening 305 near the microphone of the phone and the sound produced by the speaker of the phone to be heard more clearly when heard through the opening 305 nearest the speaker.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for protecting an electronic device, the system comprising:
   a pocket, wherein the pocket is configured to receive an electronic device capable of receiving or transmitting electronic signals;
   a cover, wherein the cover:
     is directly attached to the pocket;
     is configured to:
       cover at least a portion of the pocket; and
       prevent the electronic device from receiving or transmitting electronic signals in a direction toward the cover;
     wherein the electronic device is allowed to receive or transmit electronic signals in a direction not toward the cover; and
     includes:
   a first opening, wherein the first opening:
   is configured to allow an audio signal to pass through the cover from the user toward the mobile phone; and
   includes a mesh layer within the entirety of the first opening; and
   a second opening, wherein the second opening:
   is configured to allow an audio signal to pass through the cover from the mobile phone toward the user; and
   includes a mesh layer within the entirety of the second opening;
   wherein the first pocket and the cover are formed of a single piece of material.

2. The system of claim 1, wherein the cover includes leather.

3. The system of claim 1, wherein the cover includes cloth.

4. The system of claim 1, wherein the cover includes metal.

5. The system of claim 4, wherein the metal includes silver.

6. The system of claim 5, wherein the silver includes silver particles, wherein the silver particles are embedded within the cover.

7. The system of claim 1, wherein the cover is configured to move relative to the pocket.

8. The system of claim 7, wherein the cover is configured to move from a first position where the user has physical access to the electronic device to a second position where the cover prevents physical access to the electronic device.

9. The system of claim 8 further comprising an attachment, wherein the attachment is configured to hold the cover in the first position.

10. A system for protecting an electronic device, the system comprising:
- a pocket, wherein the pocket:
  - is configured to receive an electronic device capable of receiving or transmitting electronic signals; and
  - includes a clear portion, wherein the clear portion is configured to allow a user to access the electronic device while in the pocket;
- a cover, wherein the cover:
- is directly attached to the pocket;
- is configured to:
- cover at least a portion of the pocket; and
- prevent the electronic device from receiving or transmitting electronic signals in a direction toward the cover; and
- wherein the electronic device is allowed to receive or transmit electronic signals in a direction not toward the cover; and
- includes:
- a first opening, wherein the first opening:
- is configured to allow an audio signal to pass through the cover from the user toward the mobile phone; and
- includes a mesh layer within the entirety of the first opening; and
- a second opening, wherein the second opening:
- is configured to allow an audio signal to pass through the cover from the mobile phone toward the user; and
- includes a mesh layer within the entirety of the second opening;
- wherein the first pocket and the cover are formed of a single piece of material.

11. The system of claim 10, wherein the electronic device includes a cell phone.

12. The system of claim 10, wherein the system includes a second pocket.

13. The system of claim 12, wherein the cover is configured to cover at least a portion of the second pocket.

14. A system for protecting an mobile phone, the system comprising:
- a first pocket, wherein the first pocket:
  - includes an opening;
  - is configured to receive an mobile phone capable of receiving or transmitting electronic signals; and
  - includes a clear portion, wherein the clear portion is configured to allow a user to access the mobile phone while in the first pocket;
- a cover, wherein the cover is configured to:
  - cover at least a portion of the first pocket; and
  - prevent the mobile phone from transmitting electronic signals in the direction of the cover when the mobile phone is in use;
  - wherein the mobile phone is allowed to receive or transmit electronic signals in a direction not toward the cover; and
  - includes:
    - a first opening, wherein the first opening:
      - is configured to allow an audio signal to pass through the cover from the user toward the mobile phone; and
      - includes a mesh layer within the entirety of the first opening; and
    - a second opening, wherein the second opening:
      - is configured to allow an audio signal to pass through the cover from the mobile phone toward the user; and
      - includes a mesh layer within the entirety of the second opening;
- wherein the first pocket and the cover are formed of a single piece of material; and
- a second pocket, wherein the second pocket is configured to receive one or more credit cards.

15. The system of claim 14, wherein the second pocket is between 2.9 and 4.35 inches wide and 1.8 and 2.7 inches long.

16. The system of claim 15, wherein the one or more pockets are approximately 3.625 inches wide and 2.25 inches long.

17. The system of claim 14, wherein the second pocket is configured to prevent reading of a contact-less credit card.

* * * * *